No. 17,657. PATENTED JUNE 23, 1857.
T. D. WORRALL.
BENCH PLANE OR JOINTER.

UNITED STATES PATENT OFFICE.

THOMAS D. WORRALL, OF LOWELL, MASSACHUSETTS, ASSIGNOR TO HIMSELF AND THOMAS F. CALDICOTT, ASSIGNORS TO THOMAS F. CALDICOTT, OF CHARLESTOWN, MASSACHUSETTS.

BENCH-PLANE.

Specification of Letters Patent No. 17,657, dated June 23, 1857.

*To all whom it may concern:*

Be it known that I, THOMAS D. WORRALL, of Lowell, in the county of Middlesex and State of Massachusetts, have invented an Improved Bench Plane or Jointer; and I do hereby declare that the same is fully described and represented in the following specification and the accompanying drawings, of which—

Figure 1:
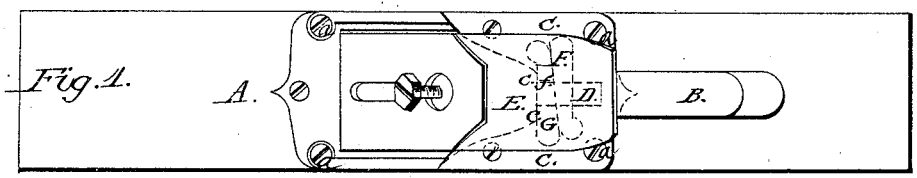
Figure 2:
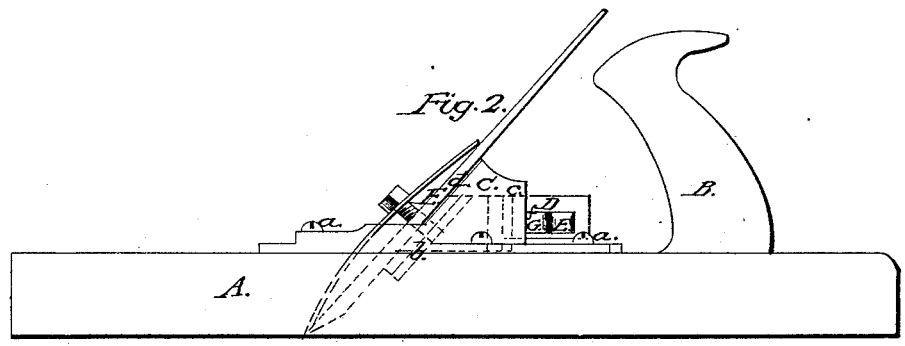
Figure 3:
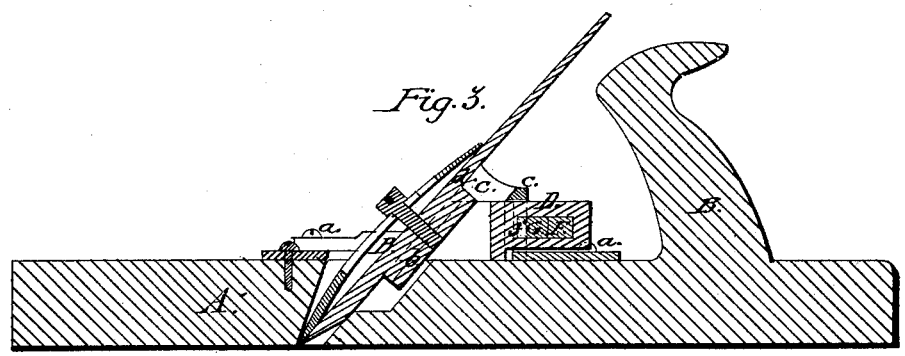
Figure 4:
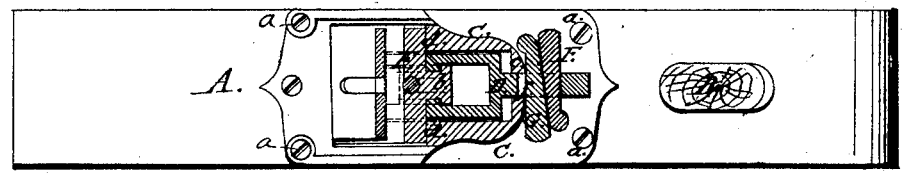

Figure 1 is a top view of the same. Fig. 2 a side elevation of it. Fig. 3 a vertical, central, and longitudinal section of it. Fig. 4 a horizontal section of its cutter holder and clamp.

In these drawings A denotes the body or stock of the plane as made of wood and having a handle B projecting upward from it, such part A generally being about one-half or less than one-half the thickness of stocks for bench planes or jointers as ordinarily made. The said stock is provided with a separate metallic cutter holder C, which is placed on its top and fastened to it by means of screws as seen at $a, a$. This cutter holder formed as shown in the drawings, is furnished with a slide clamp D, made so as to embrace a dovetailed projection $b$, extending from the rear side of the cutter or plane iron E, as shown in the drawings Such slide is provided with a slot $f$, for the reception of wedges F, G, which act against one another, the rear end of the slot and a shoulder $c$, formed in the cutter holder By driving up these wedges the cutter is drawn firmly down upon its seat $d$, formed in the holder and does not depend on the wood of the plane iron to enable it to be held in place.

By my construction of the plane important advantages are gained. It may be made lighter than ordinary planes of the kind; its cutter is more firmly held in position; its devices for clamping the cutter are compact and disposed in convenient positions for the carpenter to operate them as occasion may require. Furthermore, they are well protected both by the handle and the cutter so as not to be liable to be disturbed or disarranged except as occasion may require.

What I claim is—

The improved manufacture of carpenter's bench plane or jointer as made with its handle, its wooden stock to which said handle is affixed, and a separate metallic cutter holder, and cutter clamping devices arranged together substantially as specified.

In testimony whereof I have hereunto set my signature.

THOS. D. WORRALL.

Witnesses:
   J. C. DOWNING,
   JOHN E. CRANE.